United States Patent
Edler et al.

(10) Patent No.: US 8,932,512 B2
(45) Date of Patent: Jan. 13, 2015

(54) POLYMERS HAVING A HIGH INFRARED ABSORPTION CAPACITY

(75) Inventors: Gerhard Edler, Trebur (DE); Rainer Linzmeier, Gross-Zimmern (DE)

(73) Assignee: Merck Patent GmbH, Darmstadt (DE)

( * ) Notice: Subject to any disclaimer, the term of this patent is extended or adjusted under 35 U.S.C. 154(b) by 602 days.

(21) Appl. No.: 12/063,817

(22) PCT Filed: Jul. 26, 2006

(86) PCT No.: PCT/EP2006/007385
§ 371 (c)(1),
(2), (4) Date: Feb. 14, 2008

(87) PCT Pub. No.: WO2007/019951
PCT Pub. Date: Feb. 22, 2007

(65) Prior Publication Data
US 2010/0139855 A1 Jun. 10, 2010

(30) Foreign Application Priority Data
Aug. 15, 2005 (DE) .......................... 10 2005 038 774

(51) Int. Cl.
| B29C 65/14 | (2006.01) |
| C08K 7/16 | (2006.01) |
| C08K 9/02 | (2006.01) |
| C08K 7/00 | (2006.01) |
| C08K 3/22 | (2006.01) |
| C08K 3/30 | (2006.01) |

(52) U.S. Cl.
CPC ... C08K 9/02 (2013.01); C08K 3/22 (2013.01); C08K 3/30 (2013.01); B29C 65/1416 (2013.01)
USPC ........... 264/405; 524/430; 524/440; 523/200; 523/216; 106/417; 106/441; 106/442; 106/455; 264/482; 264/494; 264/492; 264/319

(58) Field of Classification Search
CPC ............ B29C 65/14; C08K 7/16; C08K 9/02; C08K 7/00
USPC ............. 524/432, 430, 440; 156/272; 216/65; 264/405, 482, 494, 492, 319; 523/200, 523/216; 106/417, 441, 442, 455
See application file for complete search history.

(56) References Cited

U.S. PATENT DOCUMENTS

| 4,702,964 A | 10/1987 | Hirano et al. | |
| 5,529,744 A * | 6/1996 | Tindale | 264/532 |
| 6,214,917 B1 * | 4/2001 | Linzmeier et al. | 524/430 |
| 6,376,577 B2 * | 4/2002 | Kniess et al. | 523/215 |
| 2005/0253117 A1 * | 11/2005 | Pfaff et al. | 252/500 |
| 2006/0024476 A1 * | 2/2006 | Leland et al. | 428/137 |
| 2007/0129475 A1 * | 6/2007 | Sakata et al. | 524/306 |
| 2007/0173581 A1 * | 7/2007 | Hager et al. | 524/430 |
| 2007/0199729 A1 | 8/2007 | Siegel | |
| 2007/0295689 A1 * | 12/2007 | Clauss et al. | 216/65 |

FOREIGN PATENT DOCUMENTS

| DE | 35 25 545 A1 | 1/1986 |
| DE | 238877 | 9/1986 |
| DE | 0238877 A1 | 9/1986 |
| WO | WO 2005036563 A2 | 4/2005 |
| WO | WO2006042714 | * 10/2005 |

* cited by examiner

*Primary Examiner* — James J Seidleck
*Assistant Examiner* — Deve E Valdez
(74) *Attorney, Agent, or Firm* — Millen, White, Zelano & Branigan, P.C.

(57) ABSTRACT

The present invention relates to polymers comprising absorption pigments, which are distinguished by the fact that they have high absorption in the near IR region, and to the use thereof, in particular in thermoforming and in IR light welding.

22 Claims, 1 Drawing Sheet

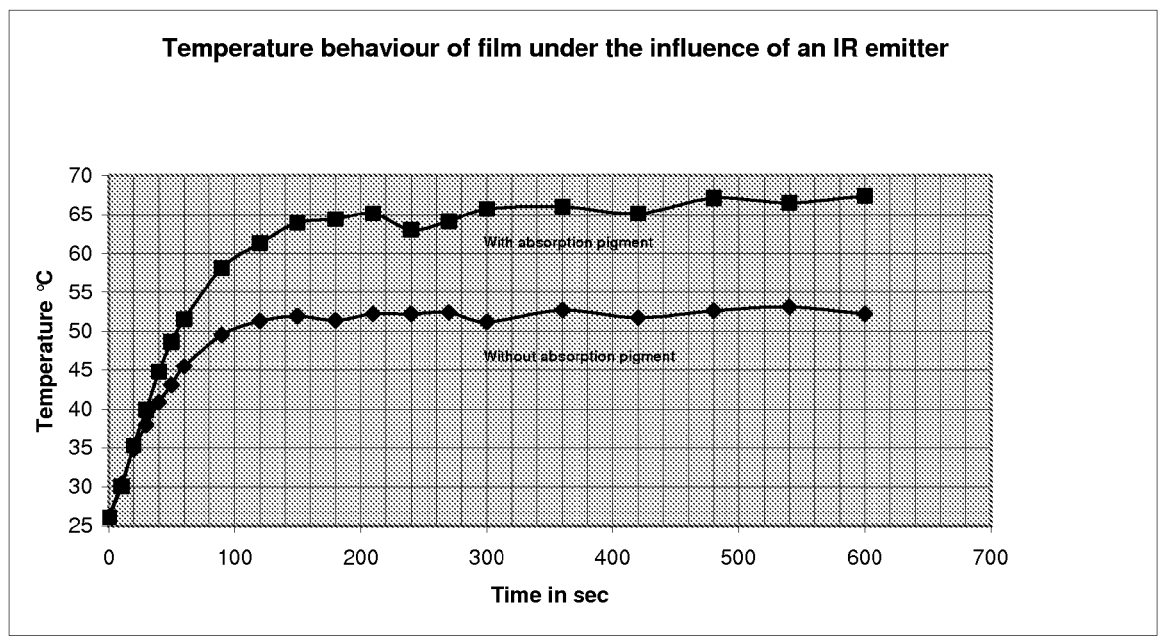

POLYMERS HAVING A HIGH INFRARED ABSORPTION CAPACITY

The present invention relates to polymers which are distinguished by the fact that they have high absorption in the near IR region, and to the use thereof, in particular in thermoforming and in IR light welding.

The heating of plastics using IR radiation is widespread in the area of thermoforming, such as the deep drawing of plastic sheets and films, and the conditioning of preforms for stretch blow moulding. However, this radiation is also employed for accelerating polymerisation and curing processes and the welding of plastic parts.

The IR source used here are hot bodies which emit IR radiation over a broad wavelength spectrum. The higher the temperature of the radiating body, the higher also the emitted energy and the shorter the wavelength. The electromagnetic spectrum of IR sources can be divided into three regions in accordance with their wavelength:

| IR type | Wavelength [nm] | Temperature [° C.] |
| --- | --- | --- |
| Short | 1000-1500 | 1500-2700 |
| Moderate | 1500-2500 | 750-1500 |
| Long | 3000-5000 | 200-750 |

More recent developments in emitter technology even reach wavelengths of up to 800 nm, i.e. as far as the region of visible light.

Since high-temperature emitters emit more energy, they represent the best heat source. However, most polymer groups only exhibit good absorption in a range from 2900 to 3700 and above 5500 nm. This means that the energy of very effective high-temperature emitters cannot be utilised sufficiently for heating polymeric systems.

In the case of pigmented plastics, the situation is even more complex, since the absorption and reflection of the pigment are now added. Black pigments have high absorption in the near infrared and therefore heat up very quickly in the short-wave IR. White pigments, by contrast, reflect visible light very well, and this property is valid into the IR region. In the case of pale colours, this results in a significant delay in heating compared with black or dark colours. Owing to this delay, it not only takes much longer until, for example, a pale plastic sheet has reached the forming temperature necessary for thermoforming, but the long dwell time may even result in damage to the plastic surface.

However, the absorption pigments known from the prior art, such as, for example, carbon black, all have the disadvantage that they permanently colour the plastic. In addition, they have to be added in comparatively high concentrations and are frequently toxicologically unacceptable.

The object of the present invention was to find a pale or white plastic colouring which simultaneously has good absorption in the near infrared region and can be carried out in a simple manner. The absorber material must exhibit pronounced absorption and an adequate reaction in this specific NIR region.

The absorber here should be easy to incorporate into the polymer system, have high transparency and only be employed in low concentrations.

Surprisingly, it has now been found that the addition of absorption pigments based on finely divided pale or transparent semiconductor materials gives a polymer system which has high absorption in the near IR, in particular in the region from 750 to >2500 nm, very particularly preferably in the region from 850 to 2500 nm, without changing the colour in the visible region. Although the absorption pigment has very high absorption in the near IR, the pigment is itself virtually white and thus only influences the properties of the polymer, such as colour and transparency, to an insignificant extent. Furthermore, the absorption pigment increases the thermal conductivity within the polymer matrix and accelerates polymerisation and curing processes.

The invention therefore relates to polymers, preferably thermoplastics, which comprise, as absorption pigment, pale or transparent particulate semiconductor materials or particulate substrates coated with pale or transparent semiconductor materials.

Suitable pale or transparent semiconductor materials are preferably those which absorb in the near IR region, in particular in the region from 750 to 2500 nm. The particulate semiconductor materials are preferably spherical, needle-shaped or flake-form particles or flake-form, spherical or needle-shaped substrates coated with semiconductor materials.

The semiconductor materials are built up homogeneously from pale or transparent semiconductor materials or applied as coating to a particulate substrate. The semiconductor materials are preferably based on oxides and/or sulfides, such as, for example, indium oxide, antimony oxide, tin oxide, zinc oxide, zinc sulfide, tin sulfide or mixtures thereof.

Suitable semiconductor materials generally have particle sizes of 0.01 to 2000 µm, preferably 0.1 to 100 µm, in particular 0.1 to 30 µm.

The semiconductor materials either consist homogeneously of the said semiconductors or are particulate, preferably spherical, needle-shaped or flake-form substrates which are mono- or multicoated with the said semiconductor materials. The substrates are preferably coated with only one layer.

The substrates can be spherical, flake-form or needle-shaped. The shape of the particles is not crucial per se. In general, the particles have a diameter of 0.01-2000 µm, particularly 0.1-300 µm and in particular 0.5-60 µm. The particularly preferred substrates are spherical and flake-form substrates. Suitable flake-form substrates have a thickness between 0.02 and 5 µm, in particular between 0.1 and 4.5 µm. The size in the two other dimensions is generally between 0.1 and 1000 µm, preferably between 1 and 500 µm and in particular between 1 and 60 µm.

The substrates are preferably natural or synthetic mica flakes, $SiO_2$ flakes, $Al_2O_3$ flakes, glass flakes, aluminium flakes, BiOCl flakes, $SiO_2$ beads, silica gel, kieselguhr, glass beads, hollow glass beads, $TiO_2$ beads, polymer beads, for example comprising polystyrene or polyamide, or $TiO_2$ needles, or mixtures of the said substrates.

The coating of the particulate substrates with the semiconductor materials is either known or can be carried out by processes known to the person skilled in the art. The substrates are preferably coated by hydrolysis of the corresponding metal salts, such as, for example, metal chlorides or metal sulfates, metal alkoxides or carboxylic acid salts in aqueous or conventional solvent solution.

In the case of the semiconductors with a homogeneous structure and also in the case of the substrates coated with one or more semiconductor materials, the semiconductor material preferably has a microcrystalline structure.

Particularly preferred absorption pigments are flake-form or spherical tin oxide, antimony oxide, indium tin oxide (ITO) and mica flakes coated with ITO, tin oxide or antimony oxide, and mixtures of the said oxides.

Particularly preferred absorption pigments are transparent or pale semiconductor materials having a powder resistance of <20 Ω·m, preferably <5 Ω·m.

A particularly preferred absorption pigment is a tin oxide doped with antimony oxide or a substrate coated therewith, such as, for example, a mica flake.

Preference is furthermore given to spherical $SiO_2$ particles coated with antimony oxide-doped tin oxide. The particle sizes of these preferred absorption pigments are preferably 1-2 μm.

Besides antimony, preferably antimony oxide, the elements of main group 3, 5 and 7 are suitable as dopant, preferably the halides, in particular chlorides and fluorides.

The doping is dependent on the semiconductor material employed and is generally 0.01-30% by weight, preferably 0.1-25% by weight, in particular 1-16% by weight, based on the semiconductor material.

Preferred mixtures are indium tin oxides with antimony-doped tin oxides and indium tin oxide with doped zinc oxides.

It is also possible to add mixtures of two, three or more absorption pigments to the polymer system, where the mixing ratio is unlimited. The total concentration is dependent on the polymer composition, but should not be greater than 30% by weight in the polymer system.

Owing to the high absorption rate, the absorption pigment is effective in the polymer system even in relatively low concentration of <1%. This also enables use in natural-coloured plastics, to which it merely imparts a slight haze. The absorption pigment can be added in amounts of 0.1-30% by weight, preferably 0.3-20% by weight, based on the polymer system. Taking into account efficacy and economy, the range from 0.3 to 10% by weight is particularly preferred.

However, the concentration of the absorption pigment in the polymer is dependent on the plastic employed. The low proportion of absorption pigment changes the plastic system insignificantly and does not influence its processability.

The uniform distribution of the absorption pigment throughout the plastic matrix causes heating of the plastic material even in the interior of the material. A more uniform heat distribution over the entire cross section is thus obtained. Particularly in the case of thick-walled parts, this reduces the formation of internal stresses during thermoforming of the plastic material, significantly shortens the warm-up time and prevents damage to the plastic surface. At the same time, the shortening of the heat-up time reduces the energy requirement, which is in turn associated with significantly lower production costs.

Transparent thermoplastics comprising the said absorption pigments in pure colouring exhibit a slight haze, but retain their transparency. The addition of 0.2 to 10% by weight, preferably 0.5 to 3% by weight, of opaque pigments, such as, for example, titanium dioxide, can, if required, completely hide this haze, in particular in polyolefins. Furthermore, colorants, which allow colour variations of any type and at the same time ensure retention of the absorber performance, can be added to the plastics. Suitable colorants are, in particular, coloured metal oxide pigments and organic pigments and dyes.

All known polymer systems, in particular thermoplastics and thermoelastic plastics, as described, for example, in Ullmann, Vol. 15, pp. 457 ff., Verlag VCH, can be doped with the absorption pigments. Suitable plastics are thermoplastics and thermoelastic plastics, such as, for example, polyethylene (PE, HDPE, LDPE), polypropylene (PP), polyamides, polyesters, polyester-esters, polyether-esters, polyphenylene ether, polyacetals, polyalkylene terephthalates, in particular polybutylene terephthalate (PBT) and polyethylene terephthalate (PET), polymethyl methacrylate (PMMA), polyvinyl acetal, polyvinyl chloride (PVC), polyphenylene oxide (PPO), polyoxymethylene (POM), polystyrene (PS), acrylonitrile-butadiene-styrene (ABS), acrylonitrile-styrene-acrylate (ASA), acrylonitrile-butadiene-styrene (ABS), polycarbonates (PC), polyether sulfones, polyurethanes (TPU) and polyether ether ketones (PEEK), and copolymers, mixtures and/or polymer blends thereof, such as, for example, PC/ABS, MABS. Besides the thermoplastics and thermoelastic plastics, thermosets, elastomers, biopolymers (semisynthetic plastics or modified natural products) are furthermore suitable.

The absorption pigment is incorporated into the polymer system by mixing the plastic granules with the absorption pigment and then shaping the mixture under the action of heat. During incorporation of the absorption pigment, it is furthermore possible to add colour and/or effect pigments and optionally additives, such as, for example, adhesives, organic polymer-compatible solvents, stabilisers and/or surfactants which are heat-stable under the working conditions, to the plastic granules. The polymer system according to the invention is generally prepared by charging a suitable mixer with the plastic granules, wetting the latter with any additives and then adding and mixing-in the absorption pigment. The pigmentation of the plastic with (in)organic colour, white, black and/or effect pigments is generally carried out via a colour concentrate (masterbatch) or compound.

The resultant mixture can then be processed directly in an extruder or injection-moulding machine. The mouldings formed during processing exhibit a very homogeneous distribution of the absorption pigment. Thermoforming or IR welding is subsequently carried out using a suitable IR light source.

The invention also relates to a process for the preparation of the polymer system according to the invention having high absorption in the near infrared, characterised in that a polymer or plastic granules, preferably a thermoplastic, is (are) mixed with the absorption pigment and optionally further additives and then shaped under the action of heat.

The polymers according to the invention are particularly suitable for thermoforming, such as the deep drawing of plastic sheets and films, and the conditioning of preforms for stretch blow moulding, for example PET bottles.

The injection stretch blow moulding of hollowware is carried out starting from injection-moulded preforms, which have to be brought to the corresponding stretching temperature (for example 90-120° C. in the case of PET) before the actual stretch blow moulding operation. This is frequently carried out with the aid of a series of IR emitters, past which the preforms are transported with rotation. The use of the plastics according to the invention having high absorption compared with conventional plastics results in faster heating of the preforms. Depending on the cycle time of the blow-moulding unit, either the cycle time can thus be reduced or alternatively the length of the emitter zone can be shortened. In both cases, the energy costs per finished part are reduced. The absorption pigment enables the heating rates of the polymer systems to be shortened to 10% of the original heat-up time, depending on the pigment concentration, emitter power and geometry of the plastic (for example wall thickness).

The plastics according to the invention are furthermore eminently suitable for the welding of plastic parts by means of IR light. In a similar manner to laser welding, infrared light welding uses a short-wave infrared radiation for melting of the join area. The radiation source used is usually a halogen lamp having a light emission in the range 500-1500 nm. The light from the lamp is focused on a focal point by means of an ellipsoidal reflector, enabling a light power of >3000 W/cm² to be achieved with a focal point diameter of about 2 mm.

The process is suitable both for direct welding of parts and also for welding in the transmission process, in which a transparent part is welded to an absorbent part. The use of the pale and transparent absorption pigment in the polymer matrix has the advantage that the two join partners can be made the same colour, since it has virtually no effect on colours present.

The polymer system pigmented in accordance with the invention can be used in all areas where thermoplastics have been employed to date. For example, mouldings of the plastic according to the invention can be used in the electrical, electronics and motor vehicle industries. The plastic system according to the invention can also be employed in packaging (films) in the foods sector. Furthermore, the polymer system according to the invention can be used in the area of construction and architecture, as well as sport and leisure.

The invention also relates to the use of the polymers according to the invention having high NIR absorption in the area of thermoforming and in the IR welding of plastic parts.

Further embodiments according to the invention are revealed by the examples and the claims.

BRIEF DESCRIPTION OF DRAWINGS

FIG. 1 shows temperature change during irradiation.

The following examples are intended to explain the invention, but without limiting it. The percent data indicated are percent by weight.

EXAMPLES

Example 1

Comparison of Natural-Coloured, Unpigmented PP with PP which is Natural-Coloured, but is Pigmented with Absorbent Pigment Films having a thickness of 350 μm are produced from polypropylene (Sabic PP 575 P) with pigmenting by
a) 0.1%
b) 0.3%
of the absorption pigment (an antimony oxide-doped tin dioxide having a particle size of about 1 μm).

As comparison, a film without pigmentation is produced. Parts are shaped from these films using a thermoforming machine from Illig (model KFG 37) with 90% of the maximum emitter power. 10 Elstein FRS/2 emitters having a power of 200 W each are used. The maximum achievable temperature is 600° C. The heat-up time required for an optimum result which is comparable between the individual films is measured in each case:

| | |
|---|---|
| PP film natural (comparison) | heat-up time: 18 sec |
| PP film comprising 0.1% of absorption pigment | heat-up time: 17.5 sec |
| PP film comprising 0.3% of absorption pigment | heat-up time: 16 sec |

As the measurement values show, the concentration of 0.1% already has a small measurable influence in this plastic system. Even with 0.3%, however, a significant shortening of the heat-up time by 2 sec, i.e. about 11%, can be achieved.

Example 2

Comparison of Two Pearlescent Films with and without Addition of an IR-Absorbent Pigment Pearlescent films having a thickness of 350 μm are produced from polypropylene (Sabic PP 575 P) with the following recipe:
a) 99% of Sabic PP 575 P
   1% of Iriodin® 123 Bright Lustre Satin pearlescent pigment from Merck KGaA (a TiO₂-coated mica pigment)
b) 98% of Sabic PP 575 P
   1% of Iriodin® 123 Bright Lustre Satin pearlescent pigment
   1% of IR absorption pigment analogous to Example 1

Film pieces measuring 5 cm×5 cm are cut out of these films and irradiated using a quartz ceramic emitter having a power of 1000 watts at a distance of 30 cm. The temperature change during the irradiation is recorded and plotted graphically (FIG. 1).

In both films, a temperature equilibrium becomes established after a certain irradiation time. This is about 13° C. or 20% higher in the case of the film comprising absorber than in the comparison without absorber, with the film without absorber reaching its equilibrium temperature of about 52° C. after an exposure time of 120 s, while this temperature is reached after only 60 s in the case of the film comprising absorber.

The invention claimed is:

1. A method of thermoforming a plastic part, comprising irradiating said plastic part with IR radiation followed by thermoforming said plastic part,
   wherein the plastic part is a thermoplastic or thermoelastic polymer system having a high IR absorption in the region of 750 to >2500 nm, comprising absorption pigments having a powder resistance of <20 Ω·m,
   wherein the absorption pigments are pale or transparent spherical, flake-form or needle-shaped particulate semiconductor materials or particulate substrates coated with pale or transparent semiconductor materials,
   wherein the particulate substrates are synthetic or natural mica flakes, $SiO_2$ flakes, $Al_2O_3$ flakes, glass flakes, aluminium flakes, BiOCl flakes, $SiO_2$ beads, silica gel, kieselguhr, glass beads, hollow glass beads, $TiO_2$ beads, polymer beads, $TiO_2$ needles or a mixture thereof,
   wherein the particulate substrates have a diameter of 0.5 to 60 μm,
   wherein the absorption pigments are present in an amount of 0.1 to 30% by weight, based on the polymer system,
   wherein the thermal conductivity of the thermoplastic or thermoelastic polymer system is increased compared to an otherwise identical thermoplastic or thermoelastic polymer system that does not contain said particulate semiconductor materials or particulate substrates coated with pale or transparent semiconductor materials.

2. A method according to claim 1, wherein the absorption pigments are semiconductor materials which have a homogeneous structure comprising pale or transparent semiconductor materials or are applied as coating to a particulate substrate.

3. A method according to claim 1, wherein the absorption pigments are semiconductor materials which have an oxidic or sulfidic structure.

4. A method according to claim 1, wherein the absorption pigments are semiconductor materials which are built up on the basis of indium oxide, antimony oxide, tin oxide, zinc oxide, zinc sulfide, tin sulfide or is a mixture of said materials.

5. A method according to claim 4, wherein the absorption pigments are semiconductor materials which are indium tin oxide (ITO).

6. A method according to claim 1, wherein the absorption pigments are particulate substrates which are synthetic or natural mica flakes.

7. A method according to claim 1, wherein the absorption pigments are semiconductor materials which are doped.

8. A method according to claim 1, wherein the absorption pigments are semiconductor materials which have an amorphous, crystalline or microcrystalline structure.

9. A method according to claim 1, wherein the absorption pigments are present in an amount of 0.3 to 10% by weight, based on the polymer system.

10. A method according to claim 1, wherein the polymer is selected from the group consisting of polyethylene (PE, HDPE, LDPE), polypropylene (PP), polyamides, polyesters, polyester-esters, polyether-esters, polyphenylene ether, polyacetals, polyalkylene terephthalate, polymethyl methacrylate (PMMA), polyvinylacetals, polyvinyl chloride (PVC), polyphenylene oxide (PPO), polyoxymethylene (POM), polystyrene (PS), acrylonitrile-butadiene-styrene (ABS), acrylonitrile-styrene-acrylate (ASA), acrylonitrile-butadiene-styrene (ABS), polycarbonates (PC), polyether sulfones, polyurethanes (TPU) and polyether ether ketones (PEEK), and copolymers and mixtures thereof.

11. A method according to claim 1, wherein the polymer system has been prepared by charging a mixer with plastic granules, wetting with optional additives, and mixing with absorption pigments, and optionally with further additives.

12. A method according to claim 1, wherein the absorption pigments are semiconductor materials which have particle sizes of 0.01 to 2000 μm.

13. A method according to claim 1, wherein the absorption pigments are semiconductor materials which have particle sizes of 0.1 to 30 μm.

14. A method according to claim 1, wherein the particulate semiconductor materials or particulate substrates coated with pale or transparent semiconductor materials are uniformly distributed throughout the polymer system.

15. A method according to claim 1, which achieves deep drawing of plastic sheets or films, or the conditioning of preforms for stretch blow molding of articles.

16. A method according to claim 1, wherein the plastic part is a thermoplastic polymer system.

17. A method according to claim 1, wherein the polymer system achieves uniform heat distribution over its entire cross section.

18. A method according to claim 1, wherein the plastic part is a thermoelastic polymer system.

19. A method according to claim 1, wherein the absorption pigment is present in an amount of 0.1 to <1% by weight, based on the polymer system.

20. A method of thermoforming a plastic part, comprising irradiating said plastic part with IR radiation followed by thermoforming said plastic part, wherein the plastic part is a thermoplastic or thermoelastic polymer system having a high IR absorption in the region of 750 to >2500 nm, comprising absorption pigments having a powder resistance of <20 Ω·m, wherein the absorption pigments are particulate substrates coated with pale or transparent semiconductor materials, wherein the particulate substrates are synthetic or natural mica flakes, $SiO_2$ flakes, $Al_2O_3$ flakes, glass flakes, aluminium flakes, BiOCl flakes, $SiO_2$ beads, silica gel, kieselguhr, glass beads, hollow glass beads, $TiO_2$ beads, polymer beads, $TiO_2$ needles or a mixture thereof, wherein the particulate substrates have a diameter of 0.5 to 60 μm, wherein the absorption pigments are present in an amount of 0.1 to 30% by weight, based on the polymer system, wherein the thermal conductivity of the thermoplastic or thermoelastic polymer system is increased compared to an otherwise identical thermoplastic or thermoelastic polymer system that does not contain said particulate substrates coated with pale or transparent semiconductor materials.

21. A method according to claim 20, wherein the absorption pigments are present in an amount of 0.3 to 10% by weight, based on the polymer system.

22. A method of thermoforming a plastic part, comprising irradiating said plastic part with IR radiation followed by thermoforming said plastic part, wherein the plastic part is a thermoplastic or thermoelastic polymer system having a high IR absorption in the region of 750 to >2500 nm, comprising absorption pigments having a powder resistance of <20 Ω·m, wherein the absorption pigments are particulate substrates coated with pale or transparent semiconductor materials, wherein the particulate substrates are synthetic or natural mica flakes, $SiO_2$ flakes, $Al_2O_3$ flakes, glass flakes, aluminium flakes, BiOCl flakes, $SiO_2$ beads, silica gel, kieselguhr, glass beads, hollow glass beads, $TiO_2$ beads, polymer beads, $TiO_2$ needles or a mixture thereof, wherein the particulate substrates have a diameter of 0.5 to 60 μm, wherein the absorption pigments are present in an amount of 0.1 to <1% by weight, based on the polymer system, wherein the thermal conductivity of the thermoplastic or thermoelastic polymer system is increased compared to an otherwise identical thermoplastic or thermoelastic polymer system that does not contain said particulate substrates coated with pale or transparent semiconductor materials.

\* \* \* \* \*